Feb. 17, 1959     T. J. LEHANE ET AL     2,873,916
STEAM HEATING SYSTEM WITH ALTERNATIVE THERMOSTAT CONTROL
Filed June 18, 1954     3 Sheets-Sheet 1
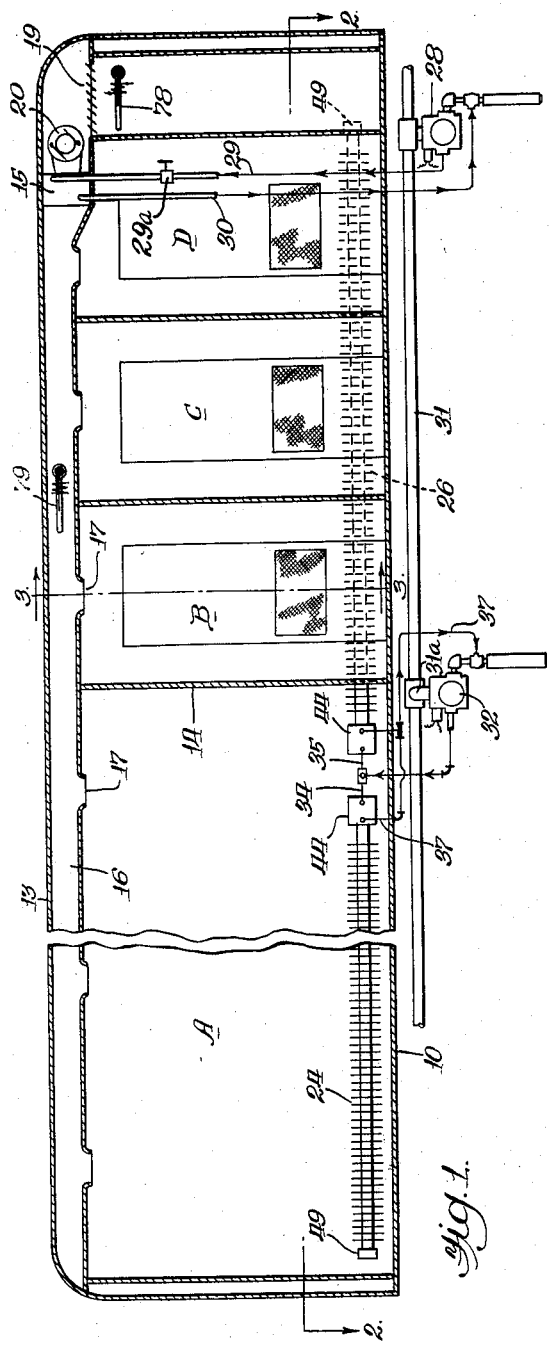
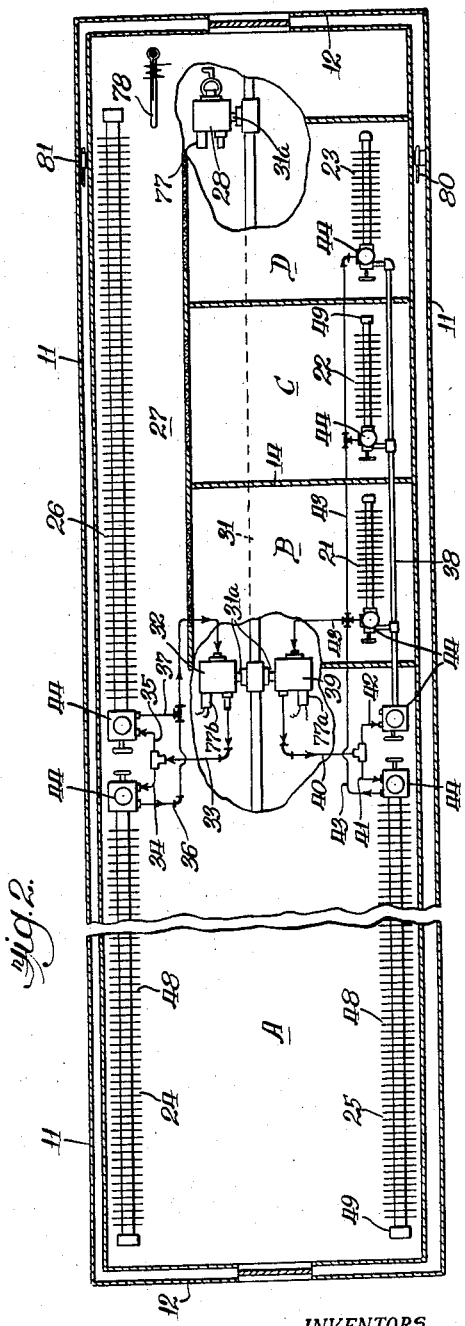
INVENTORS.
Timothy J. Lehane
William M. Smith
Robert D. Ernst
By: Harvey M. Gillespie Atty.

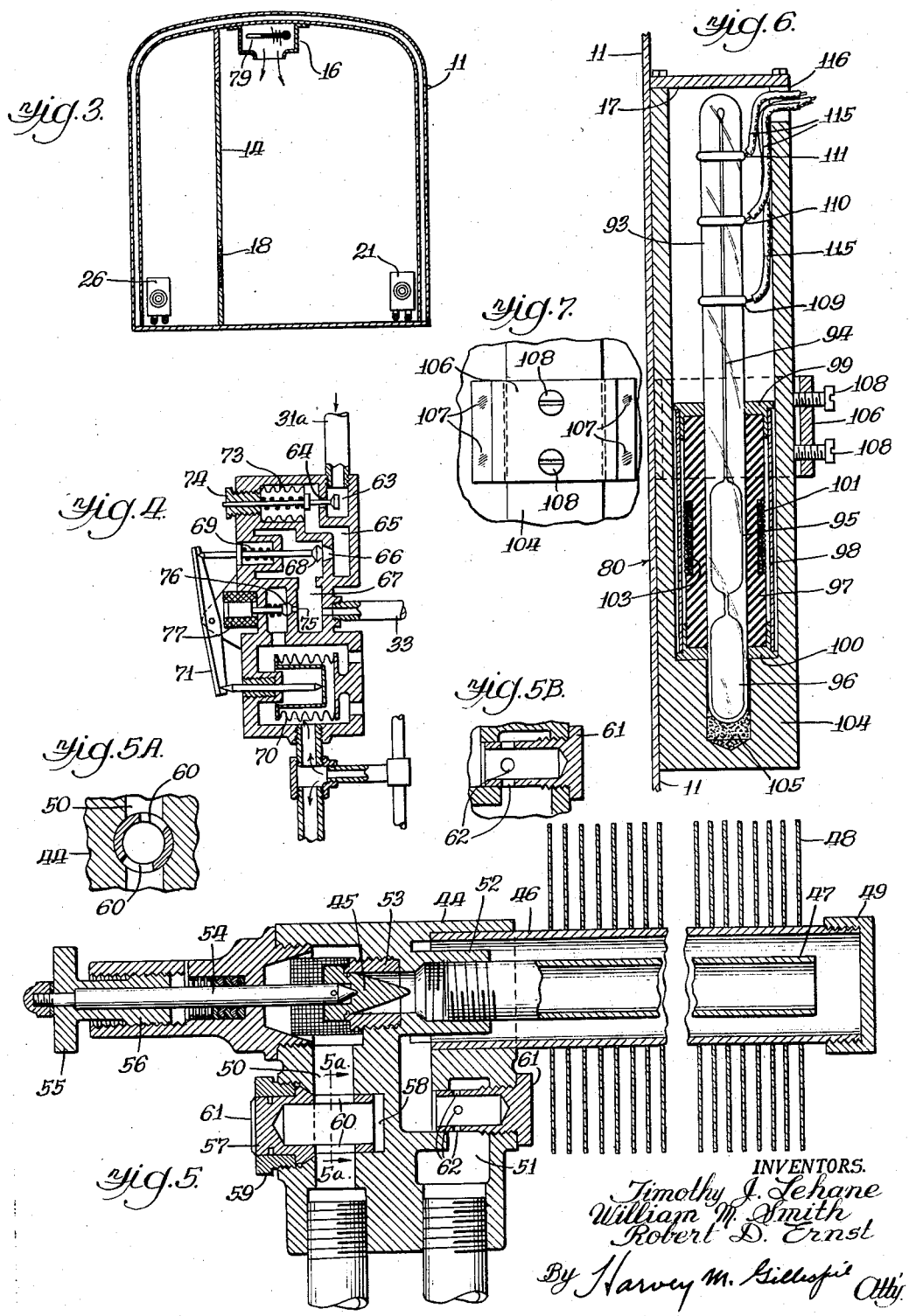

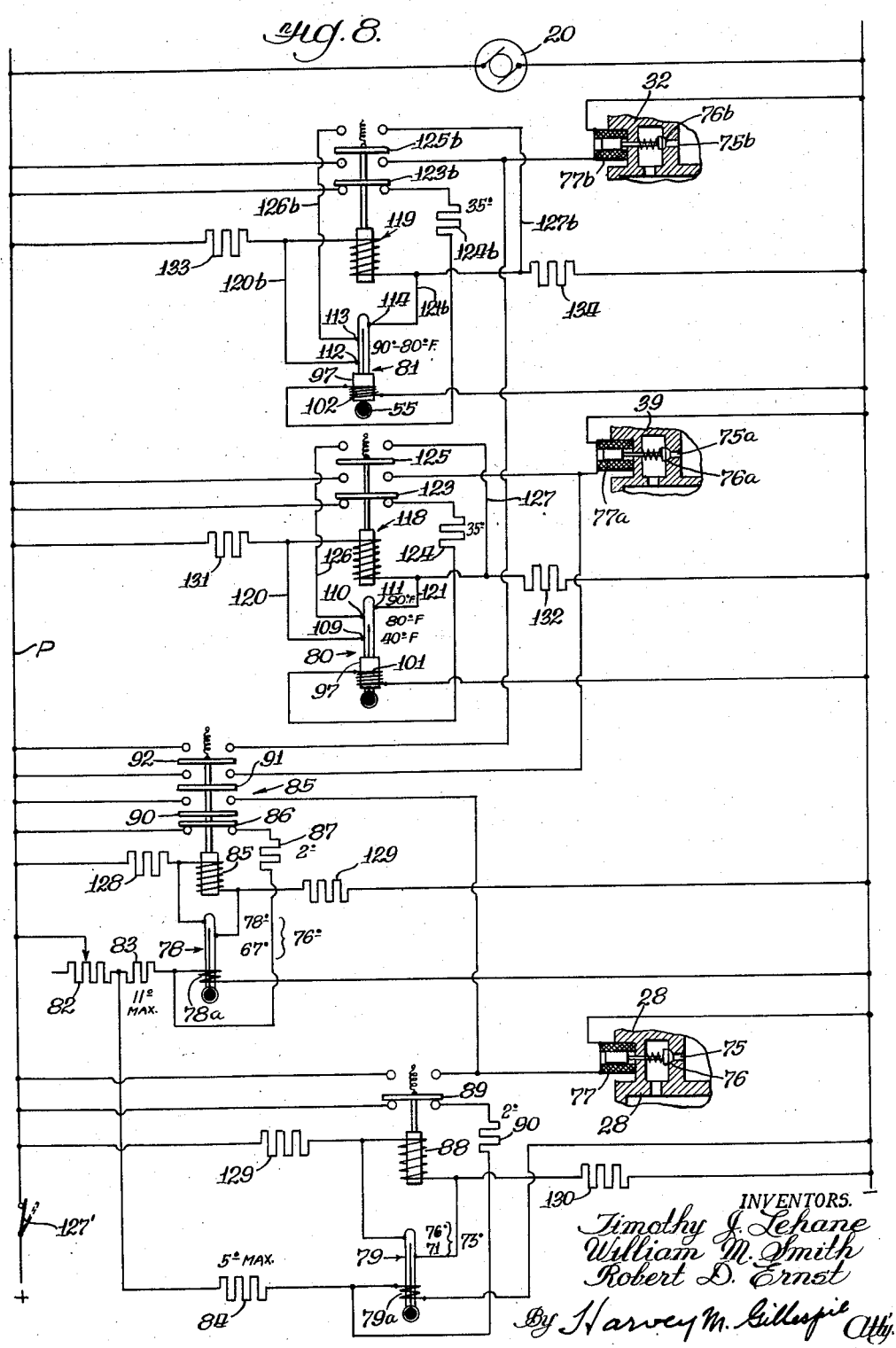

United States Patent Office 2,873,916
Patented Feb. 17, 1959

2,873,916

STEAM HEATING SYSTEM WITH ALTERNATIVE THERMOSTAT CONTROL

Timothy J. Lehane, North Riverside, William M. Smith, Lombard, and Robert D. Ernst, North Riverside, Ill., assignors to Vapor Heating Corporation, Chicago, Ill., a corporation of Delaware Application June 18, 1954, Serial No. 437,822

11 Claims. (Cl. 237—6)

The present invention relates to improvements in heating systems for railway cars and other similar passenger vehicles, the system being made subject, under certain conditions, to alternative thermostatic controls.

The invention is particularly applicable to railway cars which employ primary and secondary space heating devices. The primary heater of the present system is preferably an overhead air heater for delivering heated air into a car. The secondary heaters are preferably floor radiators arranged at opposite sides of a predetermined car. The floor radiators may be individually contained within separate compartments or they may be arranged in a large enclosure, or both. In either case the heating medium delivery to the primary and secondary heaters is controlled automatically in relation to the temperature requirements of the individual compartments or zones.

Among the more important features of the present invention is the provision of means for automatically varying the delivery of steam to the floor radiators at opposite sides of the car in order to compensate for variations in the volume of solar heat absorbed through the side walls or roof of the car and thereby influence the internal temperature of the car.

Briefly the present invention contemplates the provision of a main or body control thermostat suitably positioned within the car at a location where it will be subject to an ambient temperature representative of the overall temperature conditions within the car; a duct thermostat subject to temperature conditions within the overhead air duct; and a pair of wall thermostats which reflect the temperature conditions of the side walls of the car on opposite sides thereof. The body thermostat is a master control thermostat in that it normally controls the operation of a steam regulator which supplies steam to the overhead duct radiator and also is capable of controlling the operation of additional steam regulators which supply steam to the floor radiators. The wall thermostats are subordinate to the master control thermostat, but are capable of controlling the steam regulators for the floor radiators, but only so long as the master control thermostat remains unsatisfied. The duct thermostat is also subordinate to the master control thermostat, but it may control the steam regulator for the overhead heater, but only so long as the master thermostat remains unsatisfied.

The wall thermostats, being responsive to substantially the outside temperatures, are subject to sudden changes in the temperature differential between the wall or skin of the car and the inside ambient of the car. Therefore, in order to avoid this condition they are constructed to be somewhat sluggish in their operation.

Each admission valve for the individual radiators has a novel form of orifice fitting which may readily be adjusted to control its effective size, whereby all the radiators in the system will require the same length of time to become filled with steam.

The invention is illustrated, in certain preferred embodiments, in the accompanying drawings wherein:

Fig. 1 is a sectional view taken substantially centrally and longitudinally through a railway passenger car to which the improved heating system of the present invention has been applied. In this view the disclosure of the heating system is somewhat diagrammatic in its representation.

Fig. 2 is a sectional view taken substantially along the line 2—2 of Fig. 1.

Fig. 3 is a sectional view taken substantially along the line 3—3 of Fig. 1.

Fig. 4 is a diagrammatic sectional view of one of a plurality of thermostatically operated steam pressure regulators employed to maintain steam within the radiators at substantially atmospheric pressure.

Fig. 5 is an enlarged sectional view taken horizontally through one of a plurality of individual admission valves employed in connection with the invention.

Fig. 5a is a sectional view taken substantially along the line 5a—5a of Fig. 5.

Fig. 5b is a fragmentary sectional view of a portion of the admission valve of Fig. 5 showing a different size of orifice plug installed therein.

Fig. 6 is an enlarged sectional view of a fragmentary portion of the railway car side wall in the vicinity of one of a pair of so-called skin thermostats employed to measure the temperature of the outer wall sheet of a railway car, and showing the thermostat assembly partly in section.

Fig. 7 is a front elevational view of a portion of the structure shown in Fig. 6; and Fig. 8 is an electrical circuit diagram for the heating system.

Referring now to the general assembly shown in Figs. 1 and 2: The railway passenger car illustrated is preferably one which is subdivided into a plurality of compartments and open zones of larger area. The car is provided with a floor 10, side and end walls 11 and 12 having spaced apart inner and outer panels and roof panels 13. The space within the car is divided by vertical partitions 14 into separate enclosures including a relatively large space A and three smaller spaces B, C and D. These enclosures may vary in size and number in different cars, but for illustrative purposes herein the enclosures B, C and D represent roomettes or bedrooms while the enclosure A represents an open section such as a lounge or observation section and includes a corridor 27.

An air heater 15 constitutes the primary heater of the system. Air is forced through said heater 15 and is directed into the several enclosures A, B, C and D through an air duct 16 having outlet openings 17. Air is withdrawn from the several enclosures of the car through grilled openings 18 and is returned through a grilled opening 19 to the blower 20 for recirculation.

In order to supply heat near the floor of the various enclosures A, B, C and D, a number of finned type radiators are positioned along the car side walls, there being at least one radiator for each compartment. Specifically, single radiators 21, 22 and 23 service the compartments B, C and D respectively. Radiators 24 and 25 positioned along the opposite side walls 11 accommodate the compartment A, while a single elongated radiator 26 services the corridor 27. The radiators 21 to 26 inclusive are similar in their construction and the details thereof are shown in Fig. 5 and will be described presently.

The heating system includes a main source 31 of high pressure steam from which steam is delivered through a steam pressure regulator 28 and supply pipe 29 and admission valve 29a to the air heater 15, the condensate from the air heater 15 being conducted to a thermostatic chamber of said regulator 28 through a return line 30.

The steam line 31 also delivers steam through a second regulator valve 32, steam header 33 and supply pipes 34 and 35 to the radiators 24 and 26 respectively. Return lines 36 and 37 from the radiators 24 and 26 communicate with a common return header leading to the regulator 32.

The radiators 21, 22 and 23 receive steam from a common supply pipe 38 forming part of a single radiating system. Steam is adapted to be delivered from the line 31 through a third steam regulator 39 to the supply line 38 and also to the radiator 25 through supply lines designated 40, 41, 42 and condensation is discharged from the radiators 25, 21, 22 and 23 through an outlet conduit 43.

Each radiator has associated therewith a steam admission valve assembly 44 (see Fig. 5) including a manually operable shut-off valve element 45, the nature of which will be made clear presently. The radiators themselves are preferably of the "inner feed" type comprising inner and outer tubular sections or pipes 46 and 47, respectively, the outer pipe including a plurality of spaced radial fins 48 and being closed at one end by a cap 49 (Figs. 1 and 2). Steam entering the radiator from the supply line is conducted through the admission valve assembly 44 and valve 45 into one end of the inner pipe 47 and passes to the remote end thereof which terminates short of the end cap 49. The steam thus is reversed and flows back through the space existing between the pipes 46 and 47 and is conducted through a portion of the admission valve assembly to the discharge line.

Each admission valve assembly 44 includes a main valve casing (Fig. 5) having an internal steam inlet passage 50 and a discharge passage 51. The steam inlet passage 50 communicates with one of the supply lines, while the passage 51 communicates with one of the return lines. The valve casing is formed adjacent its upper end with an inner nipple 52 which receives an end of the inner pipe 47 of the radiator. The nipple 52 communicates through a bushing or valve seat element 53 with the inlet passage 50. The outer pipe 46 of the radiator is secured in the valve casing and communicates with the discharge passage 51.

The valve element 45 cooperates with the valve seat element 53 and is designed for manual operation by means of an operating assembly including a valve stem 54 which is secured in an operating member 55 having a shank portion 56 threadedly received in the valve casing, whereby turning of the member 55 in an appropriate direction increases or decreases the delivery of steam to the radiator.

Still referring to Fig. 5, steam flowing in the passage 50 leading to the inner pipe 47 is restricted by means of an adjustable orifice plug 57 (see also Fig. 5a). The plug 57 is in the form of a tubular member and is positioned within a transverse bore 58 formed in the casting 44 and intersecting the passage 50. The plug 57 is adapted to be clamped in any desired position by means of a threaded clamping collar 59. The plug 57 is formed with a series of radial slots 60 therein and these slots are capable of assuming different degrees of registry with the inlet passage 50 when the angular position of the plug 57 is varied. By such an arrangement the rate of flow of steam passing to the radiators may be regulated so that short circuiting of the steam through any one of the radiators may be prevented.

The condensate return passage 51 has associated therewith a second orifice plug 61 similar to the orifice plug 57 and having a series of radial openings 62 formed therein. According to the present invention, the orifice plugs 61 for the various radiators may be constructed so as to have orifice openings of different size (see Fig. 5b). These plugs may thus be precision manufactured to restrict the flow of steam and condensate through the return passage 51 and thus prevent premature operation of the steam regulator to shut off the supply of steam to the radiator.

The steam regulators 28, 32 and 39 are of a well known type and may be identical in construction. Each includes a casing (Fig. 4) defining a series of chambers. The steam passes from the train pipe 31 through a branch 31a into an inlet chamber 63 and thence through a valve controlled port 64 to a pressure chamber 65. From chamber 65 the steam passes through a valve port 66 into an outlet chamber 67. The chamber 67 communicates with the supply pipe, for example pipe 33, leading to various radiators. A valve 68 controls port 66; the said valve being normally biased toward its open position by a spring 69.

The valve 68 is closed by means of a thermostatic bellows 70 located in a chamber in which return steam is adapted to enter. The bellows 70 when exposed to the thermal action of steam expands and tilts a rocker arm 71 and thereby moves the valve 68 toward its closed position.

The port 64 is adapted to be closed by a valve element carried on a stem which is operatively connected to a pressure bellows 73 whose sensitivity may be adjusted by means of an adjusting screw 74 to maintain steam pressure in the chamber 65 at a predetermined value, for example fifteen pounds.

Still referring to Fig. 4 (see also Fig. 8), by-pass ports 75, 75a, 75b are normally maintained closed by spring closed but solenoid opened valves. These valves are designated 76, 76a and 76b (Fig. 8) for the several regulator valves 28, 32 and 39 and the solenoids for operating the several by-pass valves are designated 77, 77a, 77b. When the solenoids 77, 77a, 77b are energized, the valves 76, 76a, 76b are moved to positions to open by-pass ports 75, 75a, 75b and thereby direct steam into the chamber containing the temperature responsive bellows 70. The windings of said solenoids are adapted to be connected in a control circuit for automatic operation of the valve in accordance with the principles of the invention as will be set forth subsequently.

Referring now to Figs. 1, 2 and 8, the solenoid valve 76 of the steam regulator 28 is operable under the joint control of a main or master control thermostat 78 hereinafter referred to as the body thermostat, and a duct thermostat 79. The body thermostat 78 is conveniently positioned in the vicinity of the corridor 27 of the car near the air return grill 19 so that it will reflect the average temperature condition within the car body. The duct thermostat 79 is positioned in the heated air stream within the duct 16.

The solenoid valve 76a of the steam regulator 39 which services the floor radiators 25, 21, 22 and 23 at the righthand side of the car is operable under the control of a so-called skin thermostat 80 which is positioned to respond to the temperature of the outside sheathing of the car wall. Similarly, the solenoid valve 76b of the steam regulator 32 which services the floor radiators 24 and 26 at the left-side of the car is operable under the control of a like thermostat 81 which is responsive to the temperature of the outside metal wall of the car.

*Body and duct thermostats*

The body and duct thermostats 78 and 79 respectively are mercury column thermostats of known design provided with electrical heaters 78a—79a for adjusting their functional settings. The heaters are connected in parallel relation through a variable resistor 82 and their individual circuits include additional resistors of fixed value, but which are different with relation to each other, the resistor for the circuit for heater 78a being designated 83 and the resistor in the circuit for the heater 79a being designated 84. The relative values of the said resistors 83 and 84 are such that when all the resistance 82 is in the heater circuit, thermostat 78 will function at 78° F. and thermostat 79 will function at 76° F. When all of said resistance 82 is removed from the heater circuits, the body thremostat 78 will function at 67° F. and the duct thermostat 79 will function at 71° F. Accordingly, it can be assumed that with the shown adjustment of variable resistor 82 and having in mind the different values and the effect of the parallel connection of resistors 83, 84, the thermostats 78, 79 are now set to function at 76° and 73°, respectively.

In addition to the initial setting of the thermostats additional heating circuits are provided to produce cycling of the thermostats and consequent recurrent opening and closing of solenoid valve 76 when both thermostats are open at their contact and their temperatures are within 2° F. of their functional settings. This is accomplished by virtue of a master relay 85 which is under the control of thermostat 78. The spaced contacts of thermostat 78 are connected in shunt with the operating solenoid of the master relay 85 so that the relay 85 is energized when the thermostat contacts are open. The said additional heating circuit leads from the positive line P through an energized closed contact 86 of said relay 85 and connects into the main heating circuit intermediate the resistor 83 and the heater 78$^a$. This additional circuit includes a resistor 87 which permits only sufficient current to pass to the heater 78$^a$ to add 2° F. to the thermostat 78. The spaced contacts of the duct thermostat 79 are similarly connected in shunt with the actuating solenoid of a relay 88 and the additional heating circuit for the heater 79$^a$ leads from the positive line P through an energized closed contact 89 of said relay and connects into the main heater circuit intermediate the resistor 84 and the heater 79$^a$. This circuit includes a resistor 90 which permits sufficient current to pass to the heater 79$^a$ to raise the temperature of the thermostat 2° F.

It will be observed that the contact 89 of relay 88, when the latter is de-energized closes an energizing circuit through solenoid 77 to open by-pass valve 76 of steam regulator valve 28 and thereby directs steam to the temperature responsive bellows 70. Such energization of the solenoid by-pass valve 76, as a result of the functioning of thermostat 79, is possible only while the body thermostat 78 is calling for heat. It will be observed also that the relay 85, in addition to the energized closed contact 86, includes three normally closed but energized open contacts 90, 91 and 92 which establish solenoid energizing circuits to open said by-pass valves 76, 76$^a$ and 76$^b$ of the three steam regulators 28, 39 and 32, respectively.

*Wall thermostats*

The wall thermostats 80 and 81 are in the form of special assemblies, one of which is shown in detail in Figs. 6 and 7. Each of these latter thermostats comprises a glass capillary tube 93 for housing a mercury column 94 and provided at one end with two communicating bulbs 95 and 96 for containing a supply of mercury. Encompassing the upper bulb 95 and a portion of the lower bulb 96 is a sheath 97 of heat resistant insulating material, the latter being contained within an outer cylindrical tube 98 having closure caps 99 and 100. The winding of an auxiliary heater 101 in the case of the thermostat 80 and 102 and in the case of the thermostat 81 encompass the sheath, the latter being recessed as at 103 to receive the winding. The interpositioning of the insulating material between the heater and the upper bulb 95 slows down the heating and cooling effects on the thermostat so that a sluggish cycling action of the thermostat is obtained by the recurrent energization and de-energization of the heater 101. The assembly thus far described is received within a holder or shell 104 in the form of a hollow casing the bottom of which is recessed as at 105 to accommodate the lower end of the bulb 96. The casing is adapted to be secured to the inner surface of outer wall sheathing 11 of the car by a U-shaped strap 106 welded as at 107 to the wall and embracing the thermostat assembly. Anchoring screws 108 serve to hold the assembly in its fixed position.

Each wall thermostat 80 and 81 is provided with three electrical contacts, the contacts for the former thermostat being designated at 109, 110 and 111 and the contacts for the latter thermostat being designated at 112, 113 and 114, respectively. The various contacts just described are bonded to metal rings secured to the outer surface of the tube 93. Lead out wires 115 connected to the various contacts extend through an opening 116 in the casing 104 and a closure cap 117 is provided for the upper end of the casing.

The said wall thermostats 80, 81 may be so constructed that their lower contacts 109, 113, respectively, will be engaged by their mercury columns at a selected temperature, for example 40° F. The intermediate contacts 110, 113 are closed by the mercury columns of the thermostats at a temperature of 80° while the upper contacts 111 and 114 are engaged with the mercury column at 90° F. Resistors 124 and 124$^b$, arranged in the heater circuits of the wall thermostats 80, 81, respectively, supply sufficient electric current to the heaters 101, 102 to add 35° of temperature to said thermostats through the insulation material 97 thereof (Fig. 6). Consequently, the mercury columns of these thermostats will not engage the upper contacts 111, 114 thereof until the surface of the wall sheathing 11 attains a temperature of at least 55° F.

The wall thermostats 80, 81 are associated with relays 118, 119, respectively, adapted to control energizing circuits for the auxiliary heaters 101, 102 and to also control the energization of the actuating solenoids for the steam by-pass valves 76$^a$, 76$^b$ associated with the steam regulator valve for controlling the delivery of steam to the floor radiators. The lower contact 109 and the upper contact 111 of thermostat 80 are in a circuit and includes leads 120, 121 which are connected in shunt with the actuating solenoid 118. When the temperature at the thermostat 80 is below a temperature setting (90° F.) of the upper contact 111, the relay 118 is energized. Consequently, its bridge arm 123 closes a circuit for directing electric current through resistor 124 in sufficient volume to add said 35° of temperature to the heater 101. If and when the temperature of the said thermostat 80 rises to 90° F., the mercury column of this thermostat engages the upper contact 111 and thereby closes a shunt circuit around the solenoid of relay 118 so as to de-energize the relay. The de-energization of said relay 118 opens the auxiliary heater circuit through resistor 124, but because of the heat absorbed in the insulation 97 of the thermostat, the thermostat will cool slowly until a second shunt circuit, hereinafter described, is opened. However, the de-energization of said relay 118 causes its bridge arm 123 to close an energizing circuit through solenoid 77$^a$ and thereby opens the steam by-pass valve 76$^a$ so as to direct steam from chamber 67 of the pressure regulator 39 (Fig. 4) to the temperature responsive bellows 70 of said regulator and thereby, because of the expansion of said bellows 70, to impart a closing movement to the valve 68 so as to shut off delivery of steam to the radiators 25, 21, 22 and 23.

The above functioning of the relay 118 is effective to bring about the opening of steam by-pass valve 76$^a$ only when the master thermostat 78 is calling for heat. It will be seen, therefore, that the opening and closing of the steam by-pass valve 76$^a$ under the control of wall thermostat 80 makes it possible to control the rate at which heat is delivered into the space from the floor radiators and thereby prevents the delivery of undue volume of heat from said radiators into the enclosed spaces before the heated air from heater 15 is fully reflected in the general temperature of the enclosures.

The said second shunt circuit around the solenoid of relay 118 includes lead 120, contact 109, mercury column contact 110, lead 126, bridge arm 125 and lead 127 to the negative side of the solenoid.

From the above it will be observed that when the mercury column of wall thermostat 80 engages the upper contact 111, the relay 118 is de-energized and the bridge arm 123 moves to a position to close a circuit through solenoid 77ª to open the steam by-pass valve 76ª. Simultaneously the bridge arm 25 of the relay 118 closes the said second shunt circuit whereby the relay 118 will remain de-energized until the temperature at the thermostat 80 falls below 80° F. and the mercury column of said thermostat recedes below the intermediate contact 110 of said thermostat. At this point in the operation of the system the relay 118 will be re-energized and thereby open the energizing circuit for the solenoid 77ª and permit the steam by-pass valve 76ª to close.

Relay 119 functions to control the energization of the solenoid 77ᵇ of the steam by-pass valve 76ᵇ associated with steam regulator 32. The electrical circuits for connecting the relay 119 with its associated wall thermostat 81 and with the solenoid 77ᵇ of said steam by-pass valve 76ᵇ are substantially the same as the circuits described in connection with the relay 118 and thermostat 80. Therefore, the circuits associated with the relay 119 are given the same reference numerals which identify the circuits associated with relay 118 with the addition of an exponent "b".

Summary of operation

Bearing in mind the previously mentioned settings for the various thermostats, and assuming that the inside temperature is below the temperature setting of the body thermostat 78 and assuming also that the temperature of the outside sheathing of the car is below 55° F., the closing of the manually operable switch 127' establishes an energizing circuit through the blower 20 so as to influence circulation of air through the air heater 15. Also energizing circuits are established through each of the four relays, whereby the energizing circuits for the actuating solenoids 77, 77ª and 77ᵇ of the steam by-pass valves 76, 76ª and 76ᵇ, respectively, are opened, whereby steam is directed into the several floor radiators (Figs. 1 and 4). The closing of said switch 127 also establishes circuits through the auxiliary heaters 78ª and 79ª of the thermostats 78 and 79, respectively, and thereby establishes the functional settings of these thermostats, the setting for the thermostat 78 being 76° and the setting for thermostat 79 being 74°. Steam will be delivered to the air heater 15 and to the several floor radiators until the body thermostat reaches the temperature of 74° or, as an alternative, until one or more of the thermostats 79, 80 or 81 are caused to function.

Assuming that the thermostats 79, 80 and 81 remain open until the temperature at thermostat 78 reaches 74°, the closing of said thermostat 78 will de-energize the relay 85 and thereby open the auxiliary heating circuit through resistor 87 to remove the 2° of heat supplied to the auxiliary heater through the said resistor 87. Simultaneously with the opening of the auxiliary heater circuit at the bridge arm 86, the bridge arms 90, 91 and 92 will close so as to establish energizing circuits through the solenoids 77, 77ª and 77ᵇ of the steam by-pass valve 76, 76ª and 76ᵇ, respectively, so as to direct steam to the temperature responsive bellows 70 and thereby result in shutting off the delivery of heat to the air heater 15 and to each of the floor radiators. This de-energization of relay 85 will be only momentary since the removal of the electric current delivered through the resistor 87 will remove 2° of heat from the thermostat and, therefore, permit the mercury column to recede below the upper contact of the thermostat. However, as soon as the mercury column recedes below the upper contact the relay 85 will be re-energized. This cycling operation of thermostat 78 and relay 85 will continue until the temperature within the car is sufficient to maintain the mercury column thermostat in contact with its upper contact.

During the above described operation the delivery of heat to the air heater and to each of the floor radiators was controlled entirely by the operation of body thermostat 78 and its associated relay 85. Let it be assumed now that the heated air in duct 16 attains a temperature higher than the temperature setting of thermosat 79 (73° F.). The functioning of thermostat 79 de-energizes the relay 88 and therefore breaks the auxiliary heating circuit through the resistor 90 so as to remove 2° of heat from the thermostat and simultaneously closes an energizing circuit through the solenoid 77 to open the steam by-pass valve 76 and thereby direct steam to the temperature responsive bellows 70 of the steam regulator 28. This operation causes a momentary closing of valve 68 of the steam regulator 28 so as to shut off the delivery of steam to the air heater. As soon as the temperature of the air in the duct falls below the temperature setting of thermostat 79 the function of air heater 15 will be resumed until the temperature of the car is sufficient to cause the body thermostat to function or until the temperature of the heated air within the duct 16 is sufficient to maintain thermostat 79 closed at its upper contact.

The secondary heaters (floor radiators 21, 22, 23, 24, 25 and 26) are effective only to deliver heat into the enclosures when the surface temperature of the outside sheathing 11 of the car stands below 55° F. If the effect of solar heat on the outer sheathing of the car is sufficient to raise its temperature to said 55° F., the wall thermostats are caused to cycle by recurrent opening and closing of their contacts so as to remove and re-apply the 35° of temperature supplied by the auxiliary heating circuits which extend through the auxiliary heaters 124 and 124ᵇ, respectively. The cycling action of the thermostats 80, 81, as previously indicated, is somewhat sluggish because of the heat insulating material intervening between the auxiliary heaters 101, 102 and the thermostats 80, 81, and also by reason of the second shunt circuit which is closed through the bridge arms 125, 125ᵇ, respectively, of the relays 118 and 119. This slow or sluggish cycling operation of the thermostats 80, 81 and their respective relays 118, 119 will serve to recurrently open and close the steam by-pass valve 76ª and 76ᵇ to deliver steam to the floor radiators only for short periods of time until the temperature of the outer sheathing is sufficient to maintain the wall thermostats closed.

We claim:

1. A heating system comprising primary and secondary heaters for delivering heat into a railway car or similar enclosure, a source of heating medium, piping connecting said heaters to said heat source, admission valves interposed in said piping for controlling the admission of heating medium to said primary and secondary heaters, separate supply valves for controlling the delivery of heating medium from said source to the inlet valves of the primary and secondary heaters when said admission valves are open, a principal control means including a main thermostat responsive to the temperature within the enclosure for controlling the delivery of heating medium through said supply valves to the primary and secondary heaters, and control means subordinate to said main thermostat comprising a thermostat and a relay associated therewith responsive to a predetermined heat value delivered by said primary heater and effective only, when said main thermostat remains unsatisfied, to interrupt the delivery of heating medium to the primary heater, and a second control means subordinate to said main control thermostat comprising a thermostat and a relay associated therewith responsive to external solar heat of predetermined value and effective only, when the main thermostat remains unsatisfied, to interrupt the delivery of heating medium to the secondary heater.

2. A heating system as defined in claim 1 characterized in that the primary heater heats and delivers air into the said enclosure and in that the secondary heater comprises a radiator positioned for delivering heat directly into the enclosure near the floor thereof.

3. A heating system as defined in claim 2 characterized in that said secondary heater includes a plurality of radiators for receiving heating medium from one supply valve and in that said admission valves for the several radiators are manually adjusted, whereby the heat output of the several radiators may be varied manually and automatically maintained by said principal control means.

4. A heating system as defined in claim 3 characterized in that the floor radiators serviced by a supply valve are of different sizes and are connected therewith in parallel relation to each other and in that their admission valves are metered to deliver proportionate amounts of heating medium to the several radiators in relation to their size.

5. A heating system as defined in claim 4 characterized in that a plurality of floor radiators are arranged along each side of the car, that the radiators at opposite sides of the car are controlled by means including separate subordinate thermostats responsive to temperature conditions at opposite sides of the car for interrupting the supply of heating medium to said radiators when the main thermostat remains unsatisfied.

6. A heating system as defined in claim 5 characterized in that the subordinate thermostats associated with the means for controlling the floor radiators are positioned respectively to respond to the temperature of the outside sheathing of the opposite side walls of the car.

7. A heating system as defined in claim 6 characterized in that the car is provided with an open section and with a plurality of compartments, separate radiators are positioned in each compartment, a heating medium supply branch extends through all of said compartments and the said radiators in the several compartments are connected in parallel relation in said supply branch.

8. A heating system as defined in claim 1 characterized in that each supply valve includes a control valve element for controlling the delivery of heating medium to the heater associated therewith, a temperature sensitive element for closing said control valve element and a by-pass valve for by-passing heating medium away from the heater to the temperature sensitive element of the supply valve to effect a closing of said control valve element, and electrical means under the control of one of said subordinate thermostats for opening said by-pass valve.

9. A heating system as defined in claim 8 characterized in that each subordinate control means for a floor radiator includes an electromagnet activated relay having a pair of de-energized closed contacts connected in a circuit for energizing the electrical means for opening an associated by-pass valve and further characterized in that the subordinate thermostat constituting a part of such subordinate control means includes a pair of contacts representing upper and lower temperature limits; the upper limit contact being directly connected in shunt with the relay operating magnet and the lower limit contact being connected in shunt with said magnet through a relay contact closed by de-energization of said relay, whereby the by-pass valve opening means is energized to open the valve upon closing of said upper limit contact and the by-pass valve remains open until the thermostat is open at its lower temperature limit contact.

10. A heating system as defined in claim 9 characterized in that said subordinate thermostat includes a hollow elongated metallic casing closed at both ends and adapted for attachment to the outer metallic sheet of a railway car wall structure, a tubular envelope disposed within said casing, provided with a reservoir for containing a quantity of mercury and with a central bore for containing a mercury column projecting from said reservoir, a portion of said mercury reservoir being arranged in direct heat transfer relation with said casing, a sheath of heat insulating material surrounding a portion of said reservoir and a portion of the envelope adjacent thereto, an electrical heat winding surrounding a portion of said heat insulating sheath, and circuit means for supplying electrical energy to said electrical heat winding.

11. A heating system as defined in claim 10 characterized in that a heat conducting material surrounds a portion of said reservoir to provide a direct heat conducting contact between said reservoir and said metallic casing.

References Cited in the file of this patent

UNITED STATES PATENTS

| | | |
|---|---|---|
| 1,417,738 | Hofstad | May 30, 1922 |
| 1,885,479 | Reutter | Nov. 1, 1932 |
| 2,129,638 | Baker | Sept. 13, 1938 |
| 2,271,778 | Parks et al. | Feb. 3, 1942 |
| 2,274,736 | Parks | Mar. 3, 1942 |
| 2,518,996 | Peckham | Aug. 15, 1950 |
| 2,701,128 | Gillick | Feb. 1, 1955 |